United States Patent
LeBeuze et al.

(10) Patent No.: US 10,260,625 B2
(45) Date of Patent: Apr. 16, 2019

(54) AUTOMATIC SHIFT OF MECHANICAL GEARBOX

(71) Applicant: Clark Equipment Company, West Fargo, ND (US)

(72) Inventors: Nathalie LeBeuze, Savenay (FR); Allen C. Olheiser, Fargo, ND (US)

(73) Assignee: Clark Equipment Company, West Fargo, ND (US)

( * ) Notice: Subject to any disclaimer, the term of this patent is extended or adjusted under 35 U.S.C. 154(b) by 0 days.

(21) Appl. No.: 13/965,948

(22) Filed: Aug. 13, 2013

(65) Prior Publication Data

US 2014/0041471 A1 Feb. 13, 2014

Related U.S. Application Data

(60) Provisional application No. 61/682,450, filed on Aug. 13, 2012.

(51) Int. Cl.
*B60W 30/18* (2012.01)
*B60W 30/19* (2012.01)
(Continued)

(52) U.S. Cl.
CPC .......... *F16H 61/04* (2013.01); *B60W 10/103* (2013.01); *B60W 30/18054* (2013.01);
(Continued)

(58) Field of Classification Search
CPC ...... F16H 47/02; F16H 61/462; F16H 61/431; F16H 61/46; F16H 47/04; F16H 47/06; F16H 47/065; F16H 61/32; F16H 61/30; F16H 61/12; F16H 63/20; F16H 59/042; F16H 63/30; F16H 59/10; F16H 63/44; F16H 61/47; F16H 2059/6807;
(Continued)

(56) References Cited

U.S. PATENT DOCUMENTS 3,250,142 A 5/1966 Schuster et al.
3,913,700 A 10/1975 James
(Continued)

FOREIGN PATENT DOCUMENTS

CN 101680381 A 3/2010
DE 102009053031 5/2011
EP 1936243 6/2008

OTHER PUBLICATIONS

Search Report and Written Opinion dated Oct. 8, 2013 for International Application No. PCT/US2013/054736 filed Aug. 13, 2013, 8 pages.
(Continued)

*Primary Examiner* — William Kelleher
*Assistant Examiner* — Bobby Rushing, Jr.
(74) *Attorney, Agent, or Firm* — John D. Veldhuis-Kroeze; Westman, Champlin & Koehler, P.A.

(57) ABSTRACT

Disclosed are power machines, and drive systems for use thereon, as well as methods of providing automatic gear shifting. The drive system includes a controller configured to implement automatic gear shifting. Gear engagement is determined following a gear shift, and a drive pump or other drive system components is automatically controlled to rotate a gearbox gear in first and second directions until the gear is properly engaged.

13 Claims, 7 Drawing Sheets

(51) Int. Cl.

| | |
|---|---|
| *F16H 59/68* | (2006.01) |
| *F16H 61/04* | (2006.01) |
| *B60W 10/103* | (2012.01) |
| *F16H 61/47* | (2010.01) |
| *F16H 47/02* | (2006.01) |

(52) U.S. Cl.
CPC ..... *B60W 30/19* (2013.01); *B60W 2510/1005* (2013.01); *B60Y 2300/75* (2013.01); *B60Y 2400/71* (2013.01); *F16H 47/02* (2013.01); *F16H 61/47* (2013.01); *F16H 2059/6807* (2013.01); *F16H 2061/047* (2013.01); *Y10T 74/19251* (2015.01)

(58) Field of Classification Search
CPC .. F16H 61/04; F16H 61/68; F16H 2059/6853; F16H 2059/6838; F16D 47/02; F16D 67/00; B60W 10/103; B60W 30/19; B60W 30/18054; B60W 2510/1005; B60Y 2300/75; B60Y 2400/71
USPC ........ 74/335, 473.1, 473.11, 473.19, 473.21, 74/731.1, 732.1, 733, 733.1; 701/51, 54, 701/55; 477/38, 68, 107, 111
See application file for complete search history.

(56) References Cited

U.S. PATENT DOCUMENTS

| | | | | |
|---|---|---|---|---|
| 4,349,089 | A | | 9/1982 | Finney |
| 4,445,393 | A | * | 5/1984 | Braun ................ F16H 63/3023 192/85.57 |
| 4,641,722 | A | | 2/1987 | Bluvstein |
| 4,766,779 | A | * | 8/1988 | Massy ......................... 74/731.1 |
| 4,817,470 | A | * | 4/1989 | Muller et al. ................. 477/110 |
| 4,939,954 | A | * | 7/1990 | Walzer et al. ................ 74/733.1 |
| 4,947,687 | A | * | 8/1990 | Martini et al. ............... 74/733.1 |
| 5,014,574 | A | * | 5/1991 | Sasajima et al. ............... 477/68 |
| 5,111,716 | A | | 5/1992 | Sato et al. |
| 5,487,318 | A | * | 1/1996 | Schott ..................... F16H 59/70 74/473.37 |
| 5,505,113 | A | * | 4/1996 | Wiest ........................... 74/733.1 |
| 5,667,052 | A | * | 9/1997 | Richardson ......... F16H 61/2807 192/109 F |
| 5,749,696 | A | * | 5/1998 | Johnson ........................ 414/635 |
| 5,780,979 | A | * | 7/1998 | Kim ................................ 318/15 |
| 6,401,856 | B1 | | 6/2002 | Kohlmorgen |
| 6,692,395 | B2 | * | 2/2004 | Rodeghiero et al. ........... 475/77 |
| 7,200,980 | B2 | | 4/2007 | Kempf |
| 7,472,010 | B2 | | 12/2008 | Thomson et al. |
| 7,793,562 | B2 | * | 9/2010 | Birkel ..................... F16H 59/70 74/473.1 |
| 8,078,369 | B2 | | 12/2011 | Reith et al. |
| 8,346,446 | B2 | * | 1/2013 | Liu ....................... B60W 10/06 180/65.7 |
| 2009/0124456 | A1 | | 5/2009 | Zhang et al. |
| 2010/0138118 | A1 | * | 6/2010 | Tsukada et al. ................. 701/50 |
| 2010/0185369 | A1 | | 7/2010 | Choi et al. |
| 2010/0268410 | A1 | * | 10/2010 | Vigholm et al. ................ 701/29 |
| 2011/0172888 | A1 | * | 7/2011 | Dschida ............. F16H 61/0403 701/51 |
| 2012/0173101 | A1 | | 7/2012 | Peterson et al. |

OTHER PUBLICATIONS

Chinese Office Action and English Translation dated Nov. 15, 2016 for Chinese Application No. 201380001932.1, 18 pages.
Chinese Office Action and English Translation dated Jul. 26, 2017 for Chinese Application No. 201380001932.1, 5 pages.
Communication from European Patent Office dated Sep. 4, 2017 for European Application No. 13751046.7, 4 pages.

\* cited by examiner

AUTOMATIC SHIFT OF MECHANICAL GEARBOX

CROSS-REFERENCE TO RELATED APPLICATIONS

This application claims the benefit of U.S. Provisional Patent Application 61/682,450 filed on Aug. 13, 2012.

BACKGROUND

Power machines or vehicles include various work vehicles such as telehandlers, skid steer loaders, tracked loaders, excavators, and utility vehicles. Various power machines utilize an engine driven hydraulic system including one or more hydraulic pumps that provide pressurized hydraulic fluid to accomplish a number of tasks, including to power travel motors in a hydrostatic drive system; to raise, lower, extend, and retract a boom or a lift arm; to rotate implements that may be coupled to the power vehicle with respect to the lift arm thereof; and to provide hydraulic fluid to motors and actuators on certain implements to perform functions related to the implement, and the like.

Hydrostatic drive systems in some power machines include one or more gearboxes that are each driven by an output from a travel motor, with each gearbox in turn driving one or more axles to propel the power machine. Such gear boxes can be multiple speed gear boxes that allow for different gear ratios to provide for different speed and torque arrangements as may be advantageously employed in various applications. When shifting from one gear arrangement to another, it is necessary for a driving gear to be aligned with the driven gear for a shift to take place. If the gears are aligned, a shifting of the gears can take place smoothly. If the gears are not aligned, the driving gear must be moved to align with the driven gear to which it is to be engaged.

The discussion above is merely provided for general background information and is not intended to be used as an aid in determining the scope of the claimed subject matter.

SUMMARY

Disclosed are power machines, and drive systems for use thereon, as well as methods of providing automatic gear shifting. In a first embodiment, a drive system for a power machine is disclosed. The drive system includes a drive pump and a drive motor operably coupled to and driven by the drive pump. The drive motor has a rotational output member. A gearbox having an input shaft operably is coupled to the rotational output member of the drive motor. The gearbox includes plurality of gear reduction sets coupled to the output shaft and a coupling mechanism that couples the input shaft to the output shaft via engagement with a selected one of the plurality of gear reduction sets. A controller is configured to provide an alignment signal to align the coupling mechanism with the selected gear reduction set.

In a second embodiment, a power machine is disclosed. The power machine has a frame, a drive system, an operator compartment and a controller. The drive system includes a drive pump and a drive motor driven by the drive pump. The drive motor has a rotational output member that is coupled to an input shaft of a gearbox. The gearbox includes a plurality of gear reduction sets coupled to the output shaft and a coupling mechanism for coupling the input shaft to the output shaft via engagement with a selected one of the plurality of gear reduction sets. The operator compartment is configured to carrying an operator and has at least one operator control for selecting the selected gear reduction set. The controller is in communication with the at least one operator control and is configured to provide an alignment signal to align the coupling mechanism with the selected gear reduction set from the plurality of gear reduction sets.

In a third embodiment, a method of causing a gearbox input to be engaged with a selected one of a plurality of gear reduction sets within the gearbox in a power machine is disclosed. The power machine has a drive pump, a drive motor in communication with the drive pump and an output from the drive motor in communication with the gearbox input. The method includes receiving a signal indicating of intention to engage the selected gear reduction set. Upon receiving the signal a command signal is provided to a coupling mechanism capable of engaging the selected gear reduction set with the gearbox input. The method determines whether the coupling mechanism has engaged with the selected gear reduction set after providing the command signal. An alignment signal is provided to align the coupling mechanism with the selected gear reduction set when it is determined that the coupling mechanism has not engaged with the selected gear reduction set after providing the command signal.

This Summary is provided to introduce a selection of concepts in a simplified form that are further described below in the Detailed Description.

DRAWINGS

DETAILED DESCRIPTION

Before any embodiments of the invention are explained in detail, it is to be understood that the concepts disclosed herein are not limited in their application to the details of construction and the arrangement of components set forth in the following description or illustrated in the following drawings. The concepts illustrated in these embodiments are capable of being practiced or of being carried out in various ways. The phraseology and terminology used herein is for the purpose of description and should not be regarded as limiting. Words such as "including," "comprising," and "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Figure 1:
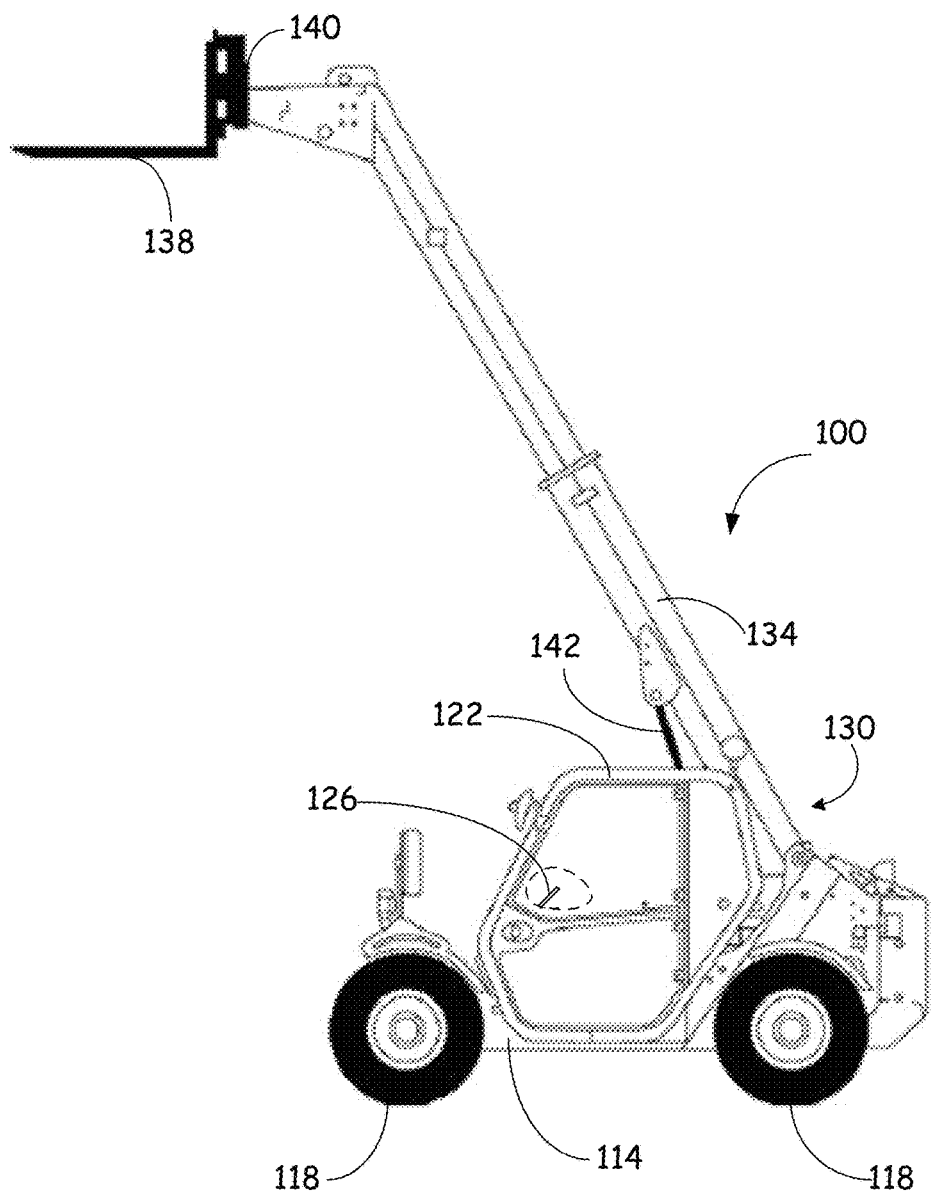
FIG. 1 is a left side view of a power machine or vehicle having a boom or lift arm according to a disclosed embodiment.

A power machine or vehicle 100 in the form of a telehandler is shown in FIG. 1 and is provided as one example of a type of power machine in which disclosed embodiments can be utilized. Other types of power machines on which the disclosed embodiments can be practiced include various types of loaders, excavators, utility vehicles, and the like. Power machine 100 includes a frame 114 supported for movement over the ground by front and rear pairs of tractive elements 118, which are illustratively shown in FIG. 1 as wheels, but can be other types of tractive elements such as powered tracks. An operator cab 122 that defines, at least in part, an operator compartment for carrying an operator, is mounted to the frame 114 and includes operator controls 126 for controlling operation of the power machine 100. Operator controls 126 can include any of a variety of different operator control device types such as joysticks, buttons, sliders, switches, touch sensitive display screens, rotatable devices that are incorporated into operator levers, handles, instrument panels, to name a few examples, and the illustrated operator controls 126 generally represent the various operator control types. An engine is mounted to the frame 114 and provides a power source for moving the wheels 118 and also for other systems. An engine, represented generally at reference number 130, is typically positioned in an enclosed compartment on the frame 114 of the machine and is generally not visible from the outside of a power machine, although is generally accessible via an access door or panel. The engine 130 of the power machine 100 shown in FIG. 1 is illustratively positioned in a compartment on a right side of power machine 100 next to cab 122, which is not visible in this figure. The engine 130 provides a power source to various power machine components. In some embodiments, the engine 130 is an internal combustion engine. Alternatively, the engine can be a hydraulic engine, an electric generator, or other types of engines, or in some cases, the engine can be a collection of one or more power sources, such as an internal combustion engine and an electric generator, such as can be found in so-called hybrid vehicles.

The power machine 100 also includes a lift arm 134, which in this embodiment is a telescopic boom pivotally mounted to the frame 114, although in other embodiments various different types of lift arms, or in some cases, a power machine may not have a lift arm. An implement carrier 140 capable of carrying an implement 138 is pivotally coupled to a distal end of the lift arm 134. The implement 138 can be any of a wide variety of implements including, as some examples, pallet forks as is shown in FIG. 1, buckets, augers, push blades, graders, and planers, to name just a few. One or more actuators 142 are pivotally coupled between the frame 114 and the lift arm 134 for raising and lowering the lift arm 134 in response to manipulation of operator controls 126 by an operator to control the position of the lift arm. In some embodiments, hydraulic cylinders are used as lift arm actuators, although other types of actuators can be employed. One or more other actuators can also be included for performing various operator controlled functions such as rotating or tilting an implement with respect to the lift arm 134. Such actuators are generally pivotally attached to each of the lift arm and the implement carrier or, in the case of various embodiments that do not have an implement carrier, to the implement itself. Another example of an operator controlled function performed by an actuator is boom extension. Other user controlled functions can be performed as well, such as control of various functions on some implements. Power machine 100 also illustratively includes an operator controlled hydraulic drive system such as the one illustrated in example embodiment shown in FIG. 2.

Figure 2:
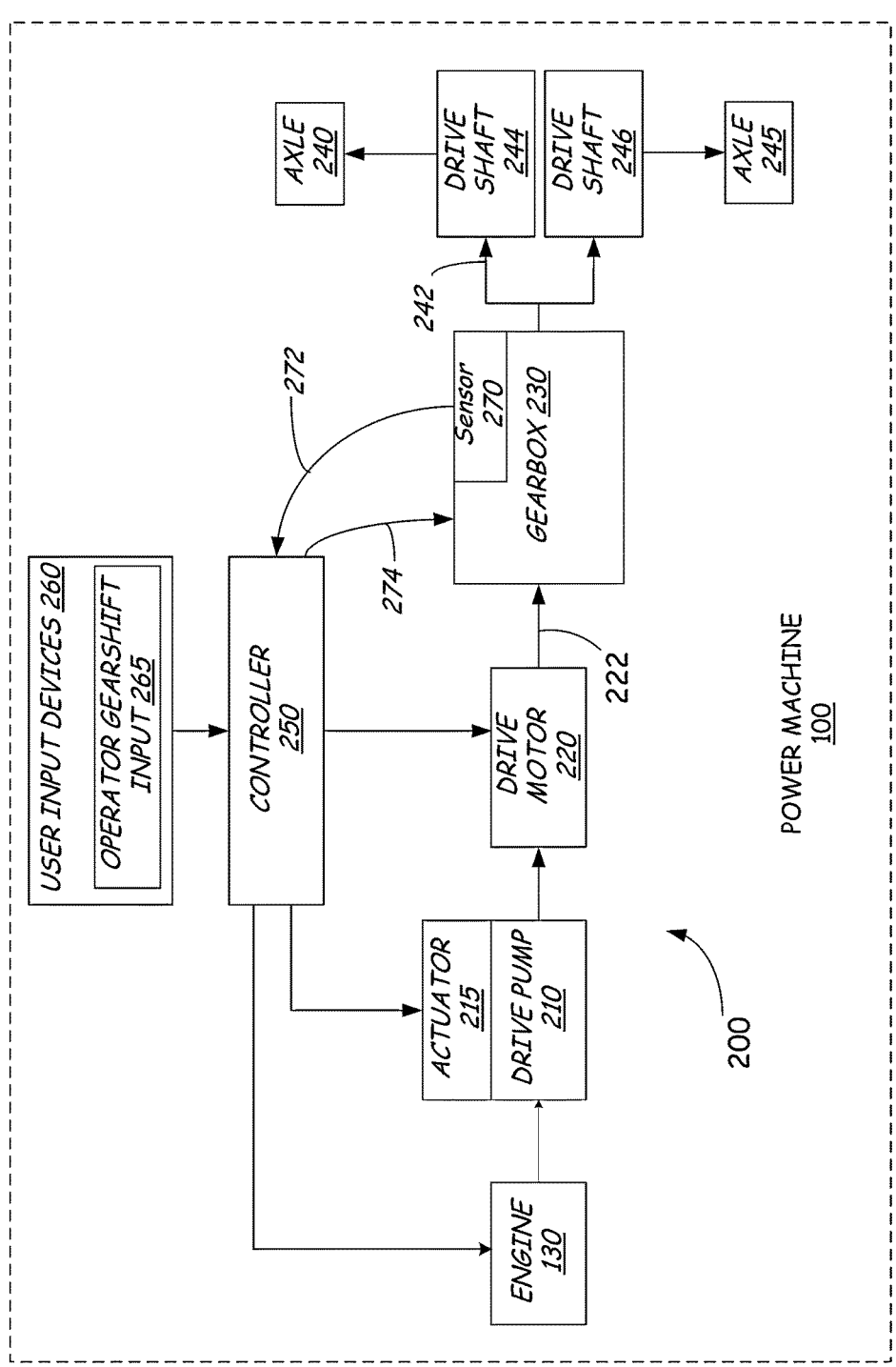
FIG. 2 is a block diagram illustrating a drive system, of exemplary disclosed power machine embodiments, providing automatic gear shifting assistance.
Figure 3:
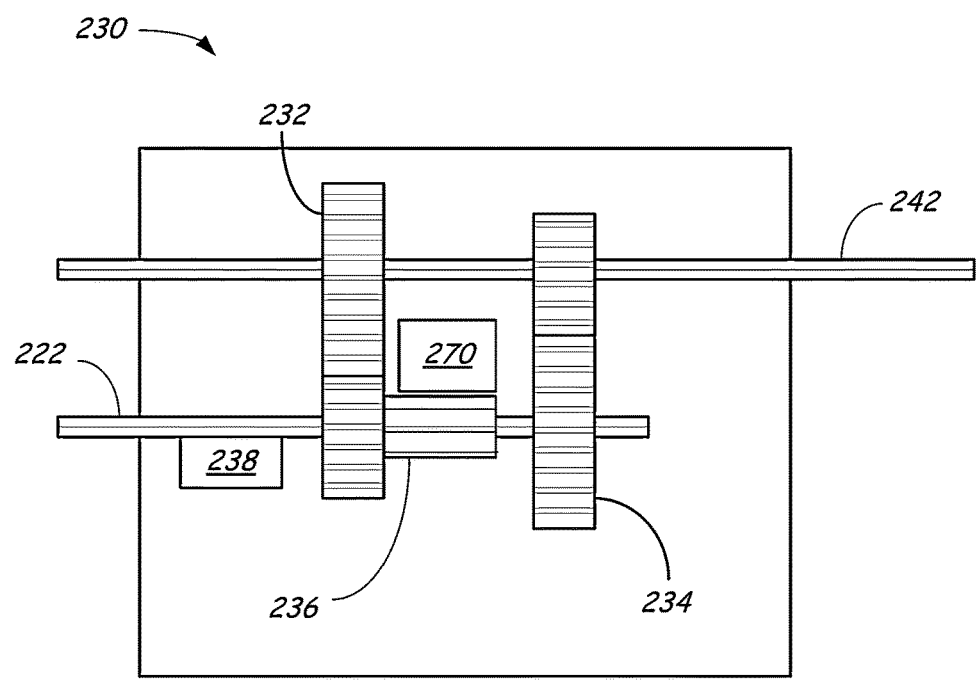
FIG. 3 illustrates a block diagram of a multiple-speed gearbox according to one exemplary embodiment.

FIG. 2 illustrates a block diagram of a drive system 200 of power machine 100 used in effecting machine travel. As shown, engine 130 powers a drive pump 210 capable of providing a hydraulic power output in the form of hydraulic fluid under pressure. Drive pump 210 is, in the illustrative embodiment, a variable displacement pump capable of providing and receiving pressurized hydraulic fluid to and from an actuation device such as the drive motor 220 shown in FIG. 2. An actuator 215 controls both the direction and amount of hydraulic flow provided by the drive pump 210 to the drive motor 220, which in turn causes the drive motor 220 to rotate in one of a first direction corresponding to forward movement of the power machine 100 and a second direction, corresponding to reverse movement of the power machine 100. The drive motor 220 provides a rotational output member 222 that is provided as an input to a mechanical gearbox 230. The mechanical gearbox 230 provides an output 242 to drive shafts 244 and 246, which are coupled to axles 240 and 245, respectively. Although shown as being tied together on one end of the gearbox 230, it should be appreciated that the output 242 can extend from each side of the gearbox with a drive shaft coupled to the end as shown in FIG. 3. Each of the axles 240 and 245 are configured to drive a pair of wheels 118 as shown in FIG. 1. It should be appreciated that various configurations can be adapted to convert a drive output from the gearbox 230 to the wheels 118 and that this example is but one possible arrangement. In other embodiments, the gearbox can drive one of the axles directly with the other axle being driven through a drive shaft coupled to an output of the gearbox.

FIG. 3 illustrates a block diagram of gearbox 230 according to one exemplary embodiment. Gearbox 230 is a multiple-speed gearbox with a plurality of gear reduction sets two are shown block diagram form 232, 234 in FIG. 3, but any number can be employed operably coupled to an output 242. The gearbox 230 further includes a coupling mechanism 236 fixedly coupled to input 222 and shown coupled to gear reduction set 232. The coupling mechanism 236 capable of selectively coupling the driving input to one of the gear reduction sets. Such coupling can only be accomplished when the coupling mechanism 236 is properly aligned with the selected gear reduction set. Because gearbox 230 does not have a clutch mechanism that can be disengaged during the coupling process, the coupling mechanism 236 can only be effectively engaged with a selected gear reduction set when the power machine is not moving or moving very slowly. A coupling actuator 238 is provided for moving the coupling mechanism 236. The coupling actuator 238 can be any device, such as a solenoid, a plurality of solenoids, a linear actuator or any other device capable of moving the coupling mechanism 236 into position to engage all of the available gear reduction sets.

Returning again to the exemplary embodiment illustrated in FIG. 2, drive system 200 is an electrically controlled drive system having a controller 250, responsive to one or more user input devices 260 including an operator gear shift input 265, and configured to control one or more of engine speed and operation, drive pump displacement and direction, drive motor operation, and gearbox operation. While a single machine controller 250 is illustrated, those of skill in the art will recognize that in alternate embodiments separate controllers can be used to control different components of the drive system and further that in some embodiments a controller that controls drive system functions can also perform other functions related to the power machine 100. An operator of power machine 100 manipulates gear shift input 265 to request a shift of gearbox 230 to a selected gear reduction set so that the coupling mechanism 236 disengages from one gear reduction set and engages the selected gear reduction set. A command signal or data is then provided to controller 250, which in turn provides a command signal 274 or data to control gearbox 230 to implement the shift, for example by providing a command signal to the coupling actuator 238. In exemplary embodiments, gearbox 230 also includes a sensor 270 which provides an output 272 indicative of whether the coupling mechanism 236 becomes properly engaged with the selected gear reduction set during a shift by, for example, measuring a position of coupling mechanism 236. If the gearbox sensor output 272 indicates that the coupling mechanism 236 has successfully engaged with the selected gear reduction set during a shift, then no further activity is necessary to complete the gear shift.

If the gearbox sensor output 272 indicates that the gears did not engage during a shift because the coupling mechanism 236 and the selected gear reduction set are not properly aligned, the controller 250 provides a command signal to the drive pump 210 to cause the drive pump to provide a small amount of hydraulic fluid to the drive motor to cause the drive motor to turn in one of the first and second directions. This movement causes the input to the gearbox to rotate slightly, which also rotates the coupling mechanism 236. This action is performed while the coupling actuator 238 is engaged, so that when the coupling mechanism 236 is aligned with the gear reduction set, the coupling mechanism 236 moves to engage the selected gear reduction set. If attempts at moving the coupling mechanism 236 do not successfully cause engagement of the coupling mechanism 236 with the selected gear reduction set, the controller 250 will attempt to increase the fluid flow to the hydraulic motor or reverse the flow to cause the drive motor to turn in the other of the first and second directions.

During the process of moving the output shaft of the drive motor (i.e. the input to the gearbox 230) to align the coupling mechanism 236 with the selected gear reduction set, the machine will not move, since the input of the gearbox is not coupled to the output of the gearbox, since the coupling mechanism 236 is not engaged with any of the gear reduction sets. Once the coupling mechanism 236 is engaged with the selected gear reduction set, the power machine can once again be driven under power. Thus, as soon as sensor 270 indicates that the coupling mechanism 236 is engaged with the selected gear reduction set, the controller stops providing an output signal to the drive pump 210 so the vehicle does not move inadvertently. Under most conditions, the entire automatic shift sequence takes less than one second to perform in exemplary embodiments, and is not noticeable by the operator of the power machine.

Figure 4:
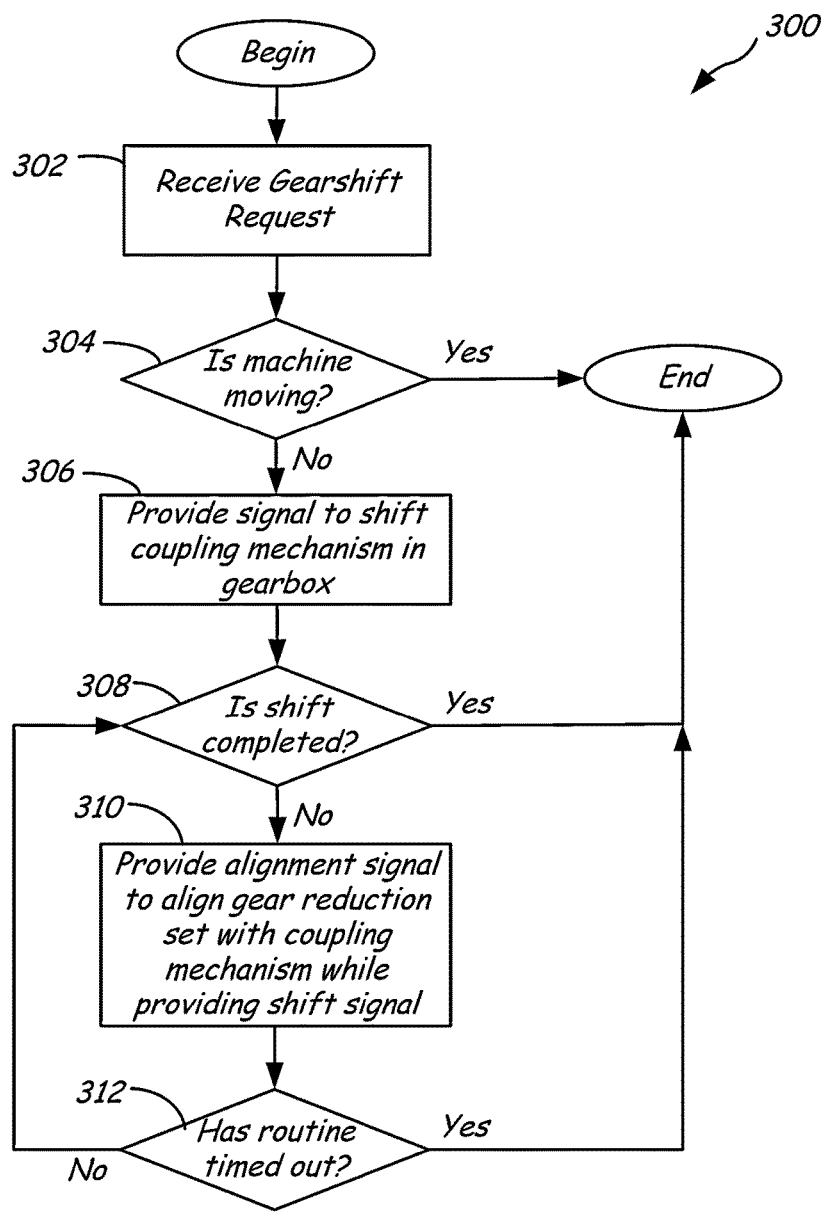
FIG. 4 is a flow diagram illustrating a method of shifting a mechanical gearbox coupled to the output of a drive motor according to one illustrative embodiment.

FIG. 4 illustrates a method 300 for controlling or implementing the gear shifting techniques described above and illustrated in FIGS. 2-3 according to one illustrative embodiment. At block 302, a signal is received at controller 250 indicative of a manipulation of operator gear shift input 265. The controller 250 thus recognizes an intention on the part of the operator to shift from one gear to another. When requesting a shift in gearbox 230 it is not advisable to attempt a shift in gearbox 230 unless the power machine 100 is not moving or at the very least is moving very slowly because damage to the gearbox 230 may result. Thus, at block 304, the controller 250 determines whether the power machine is moving. If the power machine 100 is moving, the input signal from the operator gear shift 265 is ignored. In some embodiments, the controller 250 determines that the machine is not moving by measuring ground speed and/or wheel rotation. In other embodiments, the controller 250 measures whether the machine is moving by determining whether the controller 250 has commanded the machine to move by supplying a control signal to the drive pump. In some embodiments, if the controller determines that the machine is moving the signal requesting a shift can be stored and a shift can be accomplished once the machine is stopped. In some embodiments, it is further required that a brake be applied to inhibit movement of the machine.

At block 306, the controller has both recognized an intention to shift the gearbox 230 and that the power machine 100 is not moving. At block 306, the controller 250 provides a signal to the gearbox 230 to shift the coupling mechanism 236 to engage the selected gear reduction set. At block 308, the position of the coupling mechanism 236 is determined. If the controller 250 reads an input signal from the gearbox sensor output 272 that indicates that the coupling mechanism 236 is engaged with the selected gear reduction set, the shift will be considered successfully completed. If gearbox sensor output 272 indicates that the coupling mechanism 236 is not engaged with the selected gear reduction set, the method moves to block 310 and an alignment signal is applied to the drive pump while simultaneously applying a signal to urge the coupling mechanism 236 into position. Various schemes for providing the alignment signal are detailed below. At block 312, the controller checks to determine whether the routine has timed out, that is whether the controller has attempted the shift for a predetermined amount of time with no success. If this occurs, the method ends with an unsuccessful shift. The operator will have the option of selecting one of the other gear reduction sets or attempt to try to select the same gear reduction set and attempt the entire procedure again. If the routine has not timed out, the method returns to block 308 to determine whether the shift has been successfully completed.

Figure 5:
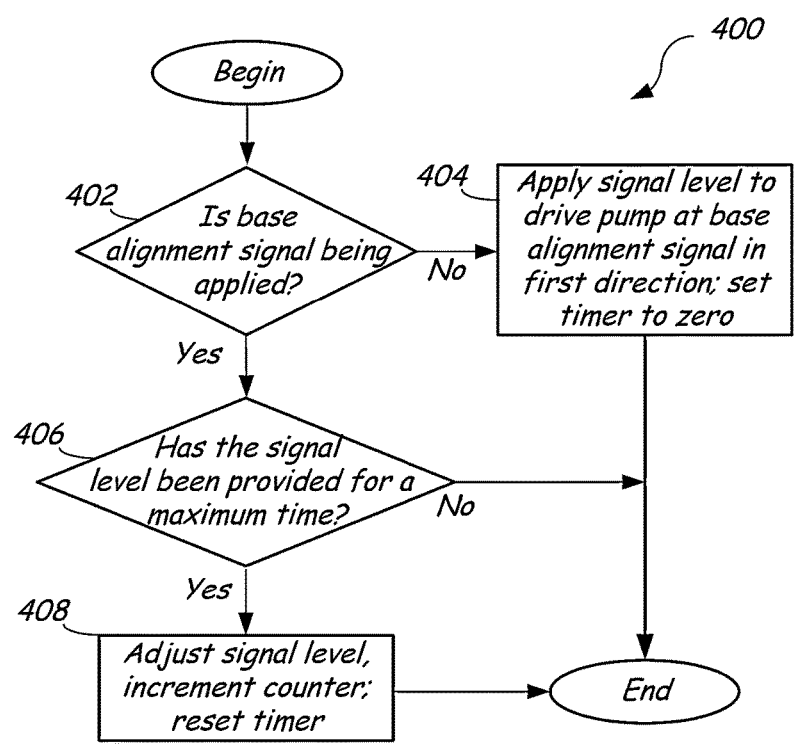
FIG. 5 is a flow diagram more particularly illustrating a method of aligning a coupling mechanism to a selected gear reduction set as part of a method of shifting a mechanical gearbox coupled to the output of a drive motor according to one illustrative embodiment.

FIG. 5 illustrates a method 400 of applying an alignment signal to the drive pump according to one illustrative embodiment. Method 400 more particularly describes one embodiment of performing the procedure of providing the alignment signal in block 310 of method 300. At block 402, the method determines whether a base alignment signal is being applied to the drive pump. If a base alignment signal is not being applied to the drive pump, the controller 250 provides a base alignment signal to command the drive pump to move in the first direction at block 404. The alignment signal provided to the drive pump is provided in a form as required by the drive pump and can be a voltage signal, a current signal, or a digital communication signal. The base alignment signal is generally provided at a level that is just enough to start a typical drive pump on a typical machine to begin movement in the first direction. If, at block 402, it is determined that an alignment signal is already being provided, the method moves to block 406, where the controller 250 determines whether the signal has been provided a maximum amount of time. If it has been determined that the controller 250 has been providing the alignment signal a maximum amount of time, the alignment signal is adjusted. In one embodiment, the alignment signal is increased by a pre-determined amount and the process is repeated and a timer measuring time is reset. This is shown at block 408. During the course of the alignment process, the alignment signal may be adjusted several times. Each adjustment may be the same amount, or alternatively, the amount of each subsequent adjustment may vary. For example, each subsequent adjustment can be larger than the previous adjustment or alternatively smaller than the previous adjustment.

Figure 6:
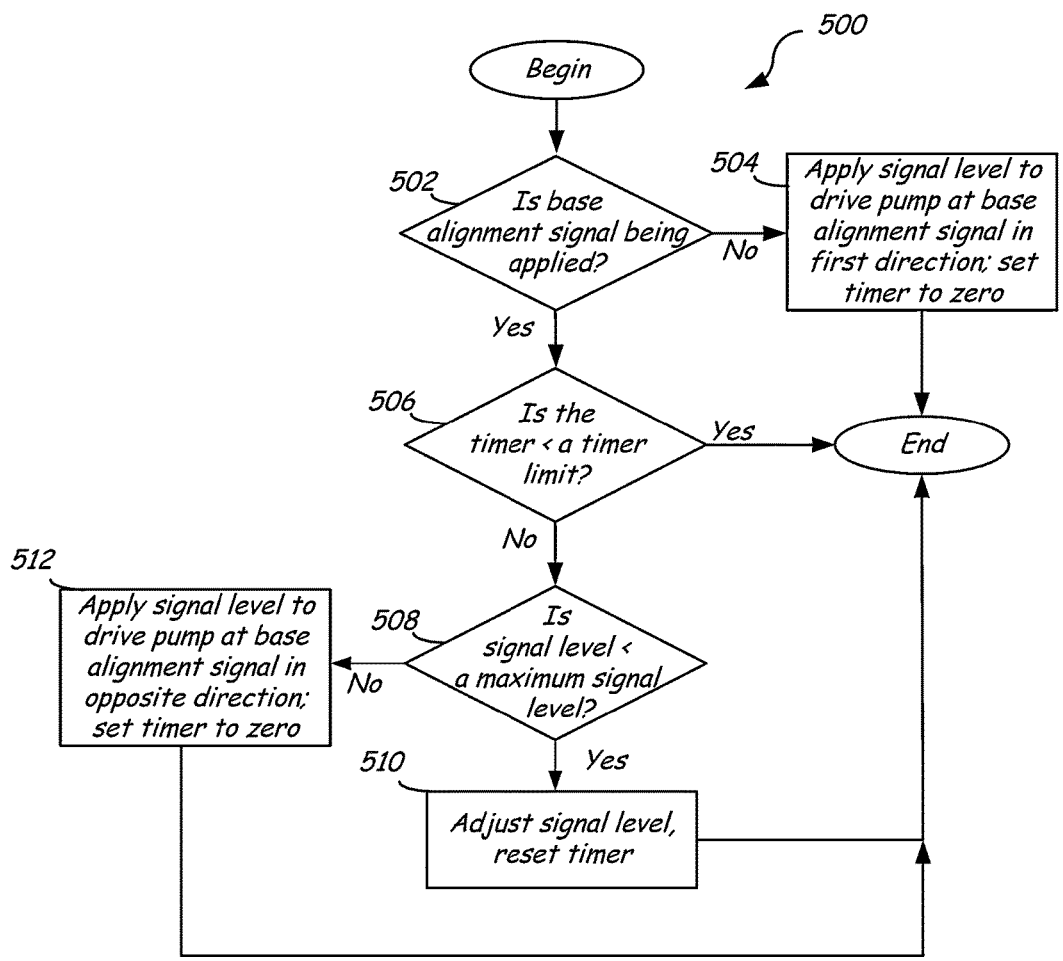
FIG. 6 is a flow diagram illustrating a method of aligning a coupling mechanism to a selected gear reduction set as part of a method of shifting a mechanical gearbox coupled to the output of a drive motor according to another illustrative embodiment.

FIG. 6 illustrates a method 500 of applying an alignment signal to the drive pump according to another illustrative embodiment. Method 500 more particularly describes another embodiment of performing the procedure of providing the alignment signal in block 310 of method 300. At block 502, the method determines whether a base alignment signal is being applied to the drive pump. If a base alignment signal has not been applied to the drive pump, the controller 250 sets the alignment signal to a base level and provides the alignment signal to the drive pump at block 504. As in method 400 described above, the base level provides an alignment signal that is just enough to start a typical drive pump in the first direction. If controller 250 determines that an alignment signal is being applied to the drive pump, at block 502, the method moves to block 506, where the controller determines whether the level of the alignment signal has been provided for a given period of time by comparing the timer against a timer limit. If the controller 250 determines that the level of the alignment signal has not been provided for the given period of time, that is that the timer is less than the timer limit, the level of the alignment signal remains unchanged and the method 500 has been completed. If, however, the controller 250 determines that the level of the alignment signal has been provided for the given period of time, the controller 250 compares the alignment signal level against a maximum alignment signal level at block 508. If the alignment signal level is less than the maximum alignment signal level, controller 250 adjusts the level of the alignment signal and resets a time indicative of how long the alignment signal has been provided at a given level at block 510. If, however, the alignment signal is not less than the maximum alignment signal level, the alignment signal level is set to the base level and the controller 250 reverses the direction in which the signal is applied so that the signal is now applied to move the drive motor in the second direction at block 512. Typically, the amount of time that it takes to move from the base level in the first direction to the maximum level, and then reverse the direction to the second direction and then increment the alignment signal level from the base level to the maximum level is about the length of time that it takes to reach the timeout at block 312.

Each of the methods 400 and 500 provide a way to align the coupling mechanism 236 with the selected gear reduction set. If the coupling mechanism 236 is not aligned with the selected gear reduction set when a shift is commanded, a preferable method is one that aligns the coupling mechanism 236 with the selected gear reduction set as quickly as possible. More preferably, such a method aligns the coupling mechanism 236 and the selected gear reduction set so quickly that an operator cannot discern the difference between a shift that is accomplished where it is necessary to align the components with one such alignment is not necessary. Each of these methods provides methods that accomplish this task by moving the output shaft of the drive pump, either in one direction as in method 400 or in one direction and then the other, if necessary, in method 500.

Figure 7:
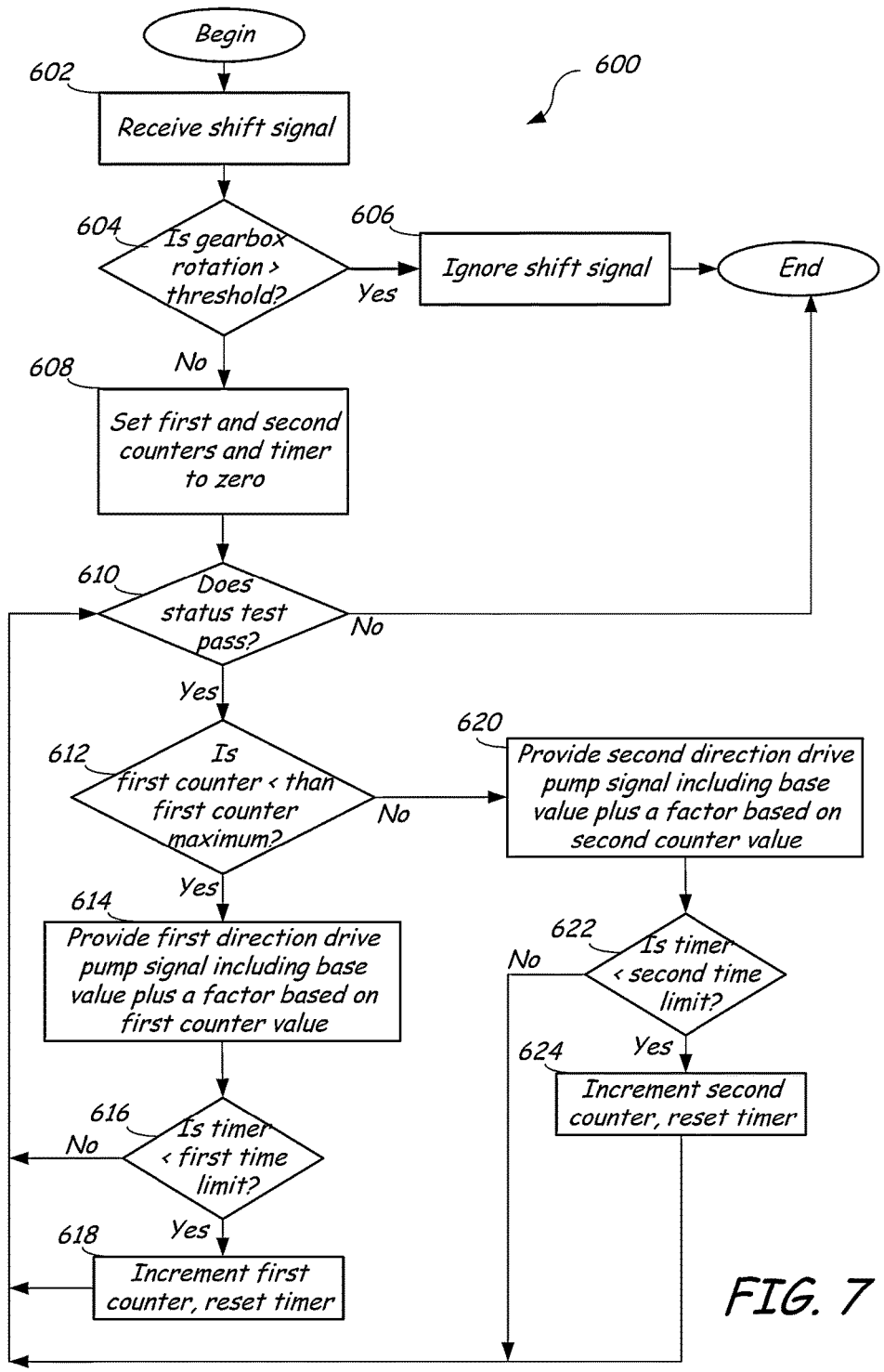
FIG. 7 is a flow diagram illustrating a method of shifting a mechanical gearbox coupled to the output of a drive motor according to another illustrative embodiment.

In some embodiments, additional factors may be considered to determine when to perform a shift. FIG. 7 illustrates another method 600 of performing shift. In block 602, the controller 250 receives a shift signal indicative of an intention on the part of the operator to perform a shift. The controller 250 then checks the rotational speed of the gearbox and compares it to a threshold value at block 604. In one embodiment, the threshold value is 2 revolutions per minute, but any acceptable threshold value may be employed. If the rotational speed of the gearbox is above the threshold value, the shift signal is ignored at block 606 and no shift is performed. If, however, the rotational speed of the gearbox is determined to be less than the threshold value, then the controller 250 will perform a gear shift by providing a signal to shift the coupling mechanism 236 to engage with a selected gear reduction set. At block 608, first and second counters and a timer are set to zero. At block 610, a status test is performed. If any of the following are true, the shift is considered over: the sensor 272 indicates that the coupling mechanism 236 is engaging the selected gear reduction indicating that the shift has been successfully completed, the gearbox is rotating at a speed greater than the threshold value, and the second counter is greater than 2. If none of these conditions are met, that is, if the status test is passed, an alignment routine is begun at block 612. The alignment routine begins by comparing the first counter, which is illustratively used to count the number of adjustments made to the base signal made in the first direction, to a first counter maximum number, which can be any number and in some embodiments is 3. If the first counter is less than the first counter maximum number, the method moves to block 614. At block 614, the controller provides a signal to the drive pump in the first direction. The signal in some embodiments is a current level. The signal is a base signal plus an adjustment that includes a factor, in some embodiments 100 mA, multiplied by the first counter. At block 616, the timer is compared against a first counter time limit for the first counter, that is, an amount of time at which a given signal is provided before the controller 250 adjusts the signal again, which in some embodiments is 100 milliseconds, but can be any amount of time. If the timer is greater than the first counter time limit, the first counter is incremented by one and the timer is reset at block 618 and the method returns to block 610. If the timer in block 616 is not greater than the first counter time limit, the method returns to block 610.

Returning to block 612, if the first counter is equal to or greater than the maximum number, the method moves to block 620 in which the controller provides a control signal to drive pump to move provide hydraulic fluid to move the drive motor in a second direction. The signal provided to the drive pump is a base signal plus an adjustment factor multiplied by the second counter. Of course, when the second counter is set to zero, as it is originally at block 608, the signal provided to the drive pump is the base signal. The base level and adjustment factor can be the same as the base level and adjustment factors used to drive the drive motor in the first direction, but they need not be. At block 622, the timer is compared against a second counter maximum time limit. If the timer is greater than the second counter maximum time limit, the second counter is incremented and the timer is reset at block 624 and the method returns to block 610. If the time is not greater than the time limit at block 622, the method returns to block 610.

Once the method returns to block 610 from any of blocks 616, 618, 622, and 624, the status test is again performed. If the status test passes at block 610, the routine moves again to block 612 and the process is repeated. If the status test fails at block 610, one of two things has occurred. The first is that the shift has been successfully completed. The second is that one of the other variables has changed resulting in an aborted shift. In such a case, the power machine 100 may have various ways of communicating to the operator that the shift has been aborted, such as through audio and/or visual indicators within the operator compartment. In some cases, the operator may be allowed to attempt the shift again by sending another request for a shift such as is illustrated in block 602 of the method 600.

The system and methods above provide several advantages over the prior art. By having a system and method capable of shifting a gearbox when a power machine is stopped by automatically aligning the selected gear reduction set with a coupling mechanism, shifting can be achieved quickly and transparently to an operator. Because the alignment does not rely on an operator to provide an input to cause the drive motor to rotate, the alignment can be accomplished without the substantial likelihood of grinding between the gear reduction set and the coupling mechanism, thereby reducing the likelihood of an undesirable sound of grinding, as well as reducing wear on the coupling mechanism and gear reduction sets.

Although the subject matter has been described in language specific to structural features and/or methodological acts, it is to be understood that the concepts disclosed herein are not limited to the specific embodiments described. Rather, the specific features and acts described above are disclosed as example forms. For example, in various embodiments, different types of power machines can include the disclosed drive system with assisted gear shifting. Also, in other embodiments, other techniques for controlling the turning of the gear to achieve engagement can be utilized. For example, in some embodiments the displacement of drive pump 210 is controlled in conjunction with control of the drive motor displacement to achieve incremental increases in gear rotation. Other examples of modifications of the disclosed concepts are also possible, without departing from the scope of the disclosed concepts.

What is claimed is:

1. A power machine, comprising:
   a frame;
   an operator compartment, for carrying an operator, mounted to the frame; and
   a drive system for selectively driving the power machine over a surface, the drive system including:
      a drive pump;
      a drive motor operably coupled to and driven by the drive pump, the drive motor having a rotational output member;
      a gearbox having an input shaft operably coupled to the rotational output member of the drive motor and an output shaft operably coupled to a wheel, the gearbox further including:
         a plurality of gear reduction sets coupled to the output shaft; and
         a coupling mechanism for coupling the input shaft to the output shaft via engagement with a selected one of the plurality of gear reduction sets;
      a gearshift input manipulable by an operator in the operator compartment to provide an indication of a selected gear reduction set;
      a sensor configured to provide an engagement feedback signal indicative of whether the coupling mechanism is engaged with the selected gear reduction set; and
      a controller in communication with the gearshift input to receive the indication of the selected gear reduction set and the sensor to receive the engagement feedback signal, and wherein when the controller determines, based on the received engagement feedback signal, that the coupling mechanism is not engaged with the selected gear reduction set, the controller provides an alignment signal to the drive pump to control the rotational output member and align the coupling mechanism with the selected gear reduction set from the plurality of gear reduction sets and wherein when the controller senses that the coupling mechanism is aligned with the selected gear reduction set, the controller stops providing the alignment signal to the drive pump to prevent inadvertent movement of the power machine.

2. The power machine of claim 1, wherein the controller is configured to provide the alignment signal to cause the rotational output member to rotate in one of a first direction and a second direction to urge the coupling mechanism into position with the selected gear reduction set.

3. The power machine of claim 2, wherein the controller is configured to provide the alignment signal to cause the rotational output member to rotate in the first direction and subsequently to rotate in the second direction.

4. The power machine of claim 1, wherein the controller is configured to provide the alignment signal at a first level and subsequently at a second level different from the first level.

5. The power machine of claim 1 and further comprising a coupling actuator configured to move the coupling mechanism and wherein the controller is configured to provide a command signal to the coupling actuator to cause the coupling mechanism to attempt to engage the selected one of the plurality of gear reduction sets.

6. A power machine, comprising:
   a frame,
   a drive system for selectively driving the power machine over a surface, including:
      a drive pump;
      a drive motor operably coupled to and driven by the drive pump, the drive motor having a rotational output member;
      a gearbox having an input shaft operably coupled to the rotational output member of the drive motor and an output shaft operably coupled to a wheel, the gearbox further including:
         a plurality of gear reduction sets coupled to the output shaft; and
         a coupling mechanism for coupling the input shaft to the output shaft via engagement with a selected one of the plurality of gear reduction sets;
   an operator compartment, for carrying an operator, mounted to the frame with at least one operator control for selecting the selected gear reduction set accessible from the operator compartment;
   a sensor positioned proximal to the coupling mechanism and configured to provide an engagement feedback signal indicative of whether the coupling mechanism is engaged with the selected gear reduction set; and
   a controller in communication with the at least one operator control and the sensor and configured to determine, based upon the received engagement feedback signal, whether the coupling mechanism is engaged with the selected gear reduction set, the controller further configured to provide an alignment signal, if determined that the coupling mechanism is not engaged with the selected gear reduction set, to cause the rotational output member to rotate, only after the controller determines that the machine is not moving, in one of a first direction and a second direction to align the coupling mechanism with the selected gear reduction set from the plurality of gear reduction sets.

7. A method of causing a gearbox input to be engaged with a selected one of a plurality of gear reduction sets within the gearbox in a power machine having a drive pump, a drive motor in communication with the drive pump and an output from the drive motor in communication with the gearbox input, comprising:

receiving a signal indicating an intention to engage the selected gear reduction set;

determining whether the power machine is moving;

providing a command signal to a coupling mechanism configured to engage the selected gear reduction set with the gearbox input only after determining that the power machine is not moving;

determining based on an engagement feedback signal from a sensor positioned proximal to the coupling mechanism whether the coupling mechanism has engaged with the selected gear reduction set after providing the command signal; and providing an alignment signal to align the coupling mechanism with the selected gear reduction set when it is determined based upon the engagement feedback signal from the sensor that the coupling mechanism has not engaged with the selected gear reduction set after providing the command signal; and providing a command signal to a coupling actuator to move the coupling mechanism to attempt to engage the selected gear reduction set.

8. The method of claim 7, wherein providing the alignment signal includes causing the gearbox input to rotate in one of a first direction and a second direction.

9. The method of claim 8, wherein providing the alignment signal includes causing the gearbox input to rotate in the first direction and subsequently in the second direction.

10. The method of claim 8, wherein providing the alignment signal includes providing the alignment signal at a first level and subsequently at a second level.

11. The method of claim 7, wherein after providing the alignment signal the method further comprises:

determining based on the engagement feedback signal from the sensor whether the coupling mechanism has engaged with the selected gear reduction set; and removing the alignment signal when it is determined that the coupling mechanism has engaged with the selected gear reduction set.

12. The method of claim 7, wherein providing the alignment signal includes commanding the drive pump to supply pressurized hydraulic fluid to the drive motor to cause the drive motor to rotate the gearbox input.

13. The method of claim 7, wherein the gearbox is a clutchless gearbox.

* * * * *